United States Patent Office 3,637,775
Patented Jan. 25, 1972

---

3,637,775
SOLUBLE COMPLEX ION METAL SILICATES
Paul C. Yates, Wilmington, Del., assignor to E. I. du Pont de Nemours and Company, Wilmington, Del.
No Drawing. Filed May 8, 1969, Ser. No. 823,169
Int. Cl. C07f 3/06
U.S. Cl. 260—429.9                     16 Claims

ABSTRACT OF THE DISCLOSURE

Silicates prepared from (i) a metal-containing cation coordinated to a polyamine ligand and (ii) a source of silica are useful as film-forming agents.

DESCRIPTION OF THE INVENTION

Summary

The present invention is directed to silicates of a metal-containing cation coordinated to a ligand, the metal being selected from the group consisting of divalent cadmium, trivalent chromium, divalent cobalt, divalent copper, divalent iron, trivalent iron, divalent manganese, divalent nickel, and divalent zinc; the ligand being a polyamine having the formula:

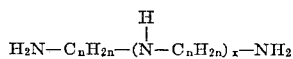

wherein $n = 2$ to 6 and
$x = 0$ to 3;

with the provisos that:

(I) the free hydroxide of the ligand coordinated metal cation is water soluble in an aqueous solution having a pH of at least 11.5 at a concentration of one-tenth of an atomic weight of metal per liter; and (II) the silicate is soluble in a solvent selected from the group consisting of water and ethanol.

The silicates can be made by two methods, the first of which comprises mixing together:

(i) a metal hydroxide selected from the group consisting of cadmium hydroxide, chromic hydroxide, cobaltous hydroxide, cupric hydroxide, ferrous hydroxide, ferric hydroxide, manganous hydroxide, nickel hydroxide, and zinc hydroxide;

(ii) a polyamine having the formula:

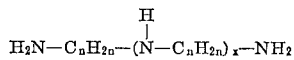

wherein $n = 2$ to 6 and
$x = 0$ to 3;

and (iii) a source of silica.

The second method involves the steps of:

(1) mixing together
(i) a water soluble salt of a metal selected from the group consisting of divalent cadmium, trivalent chromium, divalent cobalt, divalent copper, divalent iron, trivalent iron, divalent manganese, divalent nickel, and divalent zinc, (ii) a polyamine having the formula:

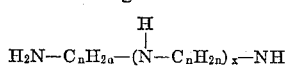

wherein
$n = 2$ to 6 and
$x = 0$ to 3, and (iii) a source of silica, and (2) contacting the mixture of step 1 with the hydroxyl form of a strong anion exchange resin.

Silica sources

Suitable sources of silica for use in preparing the composition of this invention are either high surface area colloidal amorphous silica or soluble alkaline ionic silicates. Thus one may use precipitated silica gels having surface areas greater than 20 m.$^2$/gram, such as those which can be formed by neutralization of alkaline ionic silicates with acids followed by washing. High surface area silica prepared by acid leaching silicate minerals are also suitable. Chrysotile asbestos which has been leached with a strong acid to completely remove all the magnesium ions, leaving a residue of hydrated, high surface area amorphous silica, is suitable. Aqueous colloidal suspensions of amorphous silica are also suitable starting materials. Such materials having particle sizes of from 5 to 50 millimicrons are available from E. I. du Pont de Nemours and Company, under the trade name of "Ludox" Colloidal Silicas; National Aluminate Co. of America, under the trade name of "Nalcoag" colloidal silicas; and Monsanto Chemical Co., under the trade name of "Syton" colloidal silicas.

Also suitable as sources for the silica ingredient of the compositions of the invention, and preferred because of their low cost, are soluble alkaline ionic silicates. These include sodium silicates, potassium silicates, lithium silicates, and the silicates of strong organic bases such as tetramethylammonium silicate, tetraethanolammonium silicate, and guanidine silicate. Sodium and potassium silicates are available commercially in a range of concentrations of silica and ratios of silica to be alkali metal oxide. Generally speaking, such materials are available in the form of solutions having $SiO_2$ concentrations from 20% $SiO_2$ to 35% $SiO_2$ at molar ratios of $SiO_2$ to $M_2O$, where M is an alkali metal ion, of from 1:1 to about 4:1. All such materials are suitable for preparing the compositions of this invention. The alkaline ionic silicates can be converted into polysilicic acids by deionization with the hydrogen form of an ion exchange resin. Suitable ion exchange resins are available commercially and are usually a polystyrene polymer crosslinked with small amounts of divinyl benzene and sulfonated to give the sulfonic acid ion exchange groups. These resins have ion exchange capacities of the order of 5 milliequivalents per gram of dry resin.

The polysilicic acids may be prepared from the alkali metal silicates by diluting the alkali metal silicates to concentrations of from 6% to 15% $SiO_2$ and contacting them with the hydrogen form of an ion exchange resin, thereby converting them to the corresponding concentration of polysilicic acid. Although the more concentrated polysilicic acids prepared in this fashion have only a relatively limited stability, they can be mixed immediately with a solution of the hydroxide of one of the complex cations of the invention and the resulting product is stable indefinitely.

Complex transition metal cation source

A metal-containing cation coordinated to a ligand is the other essential ingredient used in preparing the compositions of this invention. The metal is selected from the group consisting of divalent cadmium, trivalent chromium, divalent cobalt, divalent copper, divalent iron, trivalent iron, divalent manganese, divalent nickel, and divalent zinc. The preferred metal is divalent zinc. The ligand is a poly-amine selected from those having the formula:

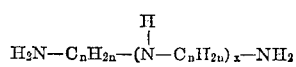

wherein n=2 to 6 and
x=0 to 3.

The preferred polyamines are those wherein $n$ is 2 or 3. The most preferred polyamines are ethylene diamine, diethylene triamine, triethylene tetraamine, and tetraethylene pentaamine, propylene diamine, and dipropylene diamine.

The polyamines have more than one coordinating amine attached to a given organic molecule and they can therefore be held to the transition metal ion at more than one point.

The preferred coordinating ligands are those in which the successive amine groups are separated from one another by two or three carbon atoms ($n=2$ or 3) which enables one to coordinate the amines to the transition metal atoms by forming a series of five- or six-membered rings. Such coordination usually is designated as chelation, and confers exceptional stability on the complex metal cation relative to its stability if coordinated to individual amine or ammonia groups not so connected to one another.

The complex cations can be prepared by contacting one of the above described amines with a soluble salt of one of the above described metals and deionizing with the hydroxyl form of a strong anion exchange resin. Suitable soluble salts are the chlorides, hydrated chlorides, nitrates, hydrated nitrates, sulfates, hydrated sulfates, perchlorates, hydrated perchlorates, cyanates, formates, and acetates of divalent cadmium, trivalent chromium, divalent cobalt, divalent copper, divalent iron, trivalent iron, divalent manganese, divalent nickel, and divalent zinc. Alternatively, the free hydroxides of the complex transition metal cations can be prepared by dissolving freshly precipitated metal hydroxide or hydrous oxide in an aqueous solution of one of the amine ligands. Once the ligand coordinated hydroxide of the transition metal cation has been prepared, it can be employed to dissolve high surface area colloidal silica or, if desired, it can be mixed with a polysilicic acid solution prepared from the deionization of an alkaline ionic silicate with the hydrogen form of an ion exchange resin.

Process conditions

The mole ratio of silica to the transition metal complex cation can vary from 9:1 to 1:1. Complexes having a mole ratio of 1:1 or 2:1 tend to be substantially more soluble and more stable than those which have higher $SiO_2$ to complex metal ion ratios, and this is particularly true if the composition is to be recovered from aqueous solution by precipitation with acetone. However, compositions having as high as a 9:1 mole ratio can be prepared and are stable, as long as precipitation is avoided. Such compositions have improved water resistance when dried as films, compared with the more soluble complexes, as might be expected.

The compositions of this invention can be made by two methods. The first method comprises mixing the metal hydroxide, the polyamine, and source of silica. Alternatively the ligand coordinated metal hydroxide can be made first by mixing the metal hydroxide and polyamine, and thereafter mixing the product with a source of silica.

The second method for preparing the compositions can be used when a soluble salt of a metal is used as the source of metal. The metal salt, polyamine, and source of silica are mixed and then contacted with the hydroxyl form of a strong anion exchange resin. A polystyrene-divinyl benzene resin substituted with quaternary ammonium anion exchange groups can be used for this purpose. Such resins are commercially available and have an ion exchange capacity of about 3–4 milliequivalents of anion per gram of dry resin. Suitable resins are "Amberlite" IRA 400, 401, and 410 made by Rohm and Haas Co., "Dowex" 1 and 2 made by Dow Chemical Co., and "Nalcite SBR" and "SAR" made by National Aluminate Co. of America.

The compositions can be concentrated by distillation to prepare a more concentrated solution. It is also possible to precipitate the compositions of the invention from aqueous solution by the addition of a solvent, such as acetone, in which the complex metal ion silicates of the invention have a low solubility. It is characteristic of the compositions of this invention that after having been precipitated, they can be redissolved in water or low molecular weight alcohols, such as ethanol, isopropanol, or methanol, and are soluble in appreciable quantities in these solvents as well as in aqueous solution. This is unusual for any silicate. Usually, alkali metal silicates or other water-soluble silicates are not soluble in organic solvents such as alcohols, but are precipitated by them.

EXAMPLES

The following examples are illustrative of the compositions which can be prepared in accordance with the invention.

EXAMPLE 1

One hundred fifty-three grams of 95% zinc chloride is dissolved in one liter of water and neutralized to a pH of 7.3 with 28% ammonium hydroxide. The resulting finely divided zinc hydroxide is filtered, washed twice by reslurrying in water and filtering, and added to 146 grams of triethylene tetramine diluted to a volume of 2 liters with water. Approximately three-fourths of the zinc hydroxide dissolves. An additional mole of triethylene tetraamine (146 grams) is added to the solution and stirred for 48 hours. The stirred product is filtered and titrated with ethylenediamine tetracetic acid, using xylenol orange as an indicator. Xylenol orange is 3,3'-bis-[N,N-di(carboxymethyl)amino-methyl]-o-cresol sulfonphthalein prepared according to the procedure of Korbles et al., Chemist Analyst, 45, 102 (1956). The titration shows that the molality of zinc in the solution is 0.63 mole. One hundred twenty grams of sodium silicate containing 0.63 mole of $SiO_2$ are diluted to one liter with water and 900 ml. of the solution are deionized with the hydrogen form of an ion exchange resin to a pH of 3.0. The ion exchange resin is a polystyrene-divinyl benzene copolymer sulfonated on the benzene rings by sulfonic acid functional groups and having an ion exchange capacity of 5 milliequivalents of exchangeable cations per gram of dry resin. The resin is sold by Fischer Scientific Co. under the trade name "Rexyn" 101. The deionized silicate is run into a stirred solution of the zinc triethylene tetramine hydroxide having a zinc molality of 0.630 molar, such that the ratio of zinc triethylene tetramine cations to silicate anions is 1:1. A small portion of this solution is dried down on a steam bath on a glass plate where it first forms a clear, viscous oil, and then a glassy, non-crazed film. Chemical analysis for a composition having the formula zinc(triethylene tetraamine)$SiO_3$, would theoretically give 22.75% zinc, 20.88% silica, 25.05% carbon, and 19.4% nitrogen. The analysis of the film of this material after drying is 23.64% zinc, 18.32% $SiO_2$, 19.95% carbon, and 13.49% nitrogen. It is seen that this composition is slightly higher in zinc and slightly lower in silica and triethylene tetraamine than a composition of the hypothetical formula zinc(triethylene tetraamine)$SiO_3$.

Twenty ml. of the concentrated zinc triethylene tetraamine silcate are mixed with 100 ml. of a sodium silicate solution containing 30% $SiO_2$, 8.7% $Na_2O$, and having a mole ratio of $SiO_2$ to $Na_2O$ of 3.22:1.0. A viscous, stable, clear solution is formed. When dried down on a glass plate on a steam bath, it forms a hazy, but brilliant hard film, showing much better water resistance than a comparable film of sodium silicate which does not contain the zinc triethylene tetraamine silicate.

EXAMPLE 2

One hundred twenty eight and nine-tenths grams of the sodium silicate used in Example 1 is diluted to 1000 ml. with distilled water. It is deionized to a pH of 3 with the hydrogen form of the ion exchange resin "Rexyn" 101, filtered from the resin and washed with distilled water. The resulting solution is added to one liter of the zinc triethylene tetraamine hydroxide of Example 1. The resulting stable solution is evaporated until its total volume is about 250 to 300 ml. This is precipitated by adding about 6 liters of acetone. The precipitate is washed with acetone and dried in a vacuum oven overnight at 50° C. The recovered dry weight is 135 grams. Chemical analysis shows that this is a sample of substantially anhydrous zinc triethylene tetraamine silicate having a ratio of 2 moles of $SiO_2$ for each mole of zinc triethylene tetraamine complex cation. This material is found to be easily soluble in water to give a clear, stable solution, and is also soluble to the extent of more than 25% by weight in ethyl alcohol.

EXAMPLE 3

One hundred fourteen and two-tenths grams of anhydrous cadmium chloride is diluted to 500 ml. and added to 146.0 grams of triethylene tetraamine and brought to a total volume of one liter with water. This is deionized with the hydroxyl form of an anion exchange resin until the composition is substantially free of chloride ion. The ion exchange resin is "Dowex" 1 which is a polystyrene-divinyl benzene copolymer substituted with quaternary ammonium ion exchange groups and has an anion exchange capacity of 4 milliequivalents per gram of dry resin. The resulting cadmium triethylene tetraamine hydroxide solution has a pH of 13.0. To 1000 grams of this solution are added 600 grams of a 6% $SiO_2$ solution prepared by deionizing a 6% sodium silicate solution having a mole ratio of $SiO_2$ to $Na_2O$ of 3.22:1.0 to a pH of 3 with the hydrogen form of the ion exchange resin "Rexyn" 101. The resulting 1600 grams of solution is concentrated by vacuum distillation at 35° C. to 348 grams. This composition is analyzed and is shown to have 10.95% nitrogen, 12% cadmium, and 9% $SiO_2$. This analysis corresponds to a mole ratio of 2 moles of triethylene tetraamine per one of cadmium in the complex metal cation and a mole ratio of 1.5 moles of silica per 1 mole of complex metal cation.

EXAMPLE 4

Sixty eight and one-tenth grams of zinc chloride are diluted to 500 ml. and 95.0 grams of triethylene tetraamine are added. This solution is then diluted to one liter and deionized with the hydroxyl form of the anion exchange resin "Dowex" 1 until substantially free of chloride ions. The pH at this point is 13.0. To 1000 grams of this solution is added 600 grams of a 6% deionized polysilicic acid prepared by deionizing sodium silicate having 6% $SiO_2$ and a $SiO_2$ to $Na_2O$ mole ratio of 3.22:1.0 to a pH of 3 with the hydrogen form of the ion exchange resin "Rexyn" 101. The resulting 1600 grams of clear solution is concentrated to 237 grams and analyzed. Chemical analysis shows it to contain 4.86% nitrogen, 7.13% $SiO_2$ and 2.76% zinc. This analysis corresponds to a complex metal cation containing 2 moles of triethylene tetraamine per mole of zinc, and with the mole ratio of silica to complex metal cation of 2.85:1.

EXAMPLE 5

One hundred twenty-nine grams of cobaltous chloride is diluted to 509 ml. and to this are added 146.2 grams of triethylene tetraamine which has been diluted to 1 liter. The mixture is deionized to a pH of 13.0 with the hydroxyl form of the anion exchange resin "Dowex" 1 while maintaining the solution under an inert atmosphere to avoid the oxidation of the complex polyamine cobalt cation to trivalent cobalt. One thousand grams of the solution is mixed with 600 grams of a 6% polysilicic acid solution prepared by deionizing 6% sodium silicate having a $SiO_2$ to $Na_2O$ mole ratio of 3.22:1.0 to a pH of 3 with the hydrogen form of the ion exchange resin "Rexyn" 101. The resulting 1600 grams of clear, purple solution are concentrated to 250 grams by vacuum evaporation under the protection of an inert atmosphere of nitrogen. Chemical analysis indicates 2 moles of triethylene tetraamine per mole of cobalt in the complex cation, and a mole ratio of silica to this complex cation of 1:1. Evaporation of this film to dryness and firing, gives a hard, water-insoluble film of cobalt silicate.

Utility

The compositions of this invention are useful as film-forming agents and possess the property of becoming water-insoluble as a result of heating. The compositions are good film-forming agents when dried at close to room temperature, but if heated at temperatures above 200° C., particularly over long periods of time, the organic ligands are decomposed by the combination of heat and oxidation and the resulting polyvalent metal silicate film formed is water-insoluble. It is thus possible to prepare insoluble films such as zinc silicate from soluble precursors using the compositions of this invention.

Another use for the compositions of this invention is as a compatible insolubilizing agent for alkali metal silicates. Thus one of the compositions of the invention, such as zinc triethylene tetraamine silicate, can be added to sodium silicate, and even in relatively small quantities, after drying and heating to eliminate the triethylene tetraamine will give extremely water-insoluble films. In this respect, the complex ion metal silicates are unique because they are a truly soluble, completely homogeneous precursor and source of insolubilizing ions such as zinc.

In the practices of the prior art it has always been necessary to introduce polyvalent metals such as zinc, copper, nickel, and the like into silicates in the form of water-insoluble particles. For example, the art is familiar with the practice of insolubilizing sodium silicate films by mixing same with zinc oxide. This has had the limitation that the insolubilization is difficult to control since it depends upon the rate of a heterogeneous reaction occurring at the surfaces of the zinc oxide particles and thereby on the degree of dispersion and particle size of the zinc oxide. It has the further disadvantage that the product resulting from this reaction is not homogeneous but contains a high concentration of zinc in the immediate neighborhood of zinc oxide particles and a very low concentration of zinc in surrounding areas. In contrast, the compositions of this invention contain a uniform and homogeneous distribution of the insolubilizing polyvalent metal ion.

As a specific example, it has usually been necessary to prepare zinc silicate phosphors by precipitation from aqueous solution of the insoluble zinc silicate, and these in turn have had to be dispersed in a second binder solution such as potassium silicate, and dried down in order to prepare a phosphor film. With the compositions of this invention, it is possible to deposit a uniform, homogeneous, zinc silicate phosphor film in which the zinc silicate itself is its own binder and such a film is homogeneous rather than heterogeneous as are the zinc phosphors of the prior art.

The compositions of this invention are useful also as coupling agents, since they have a strong affinity for glass surfaces, and certain of the coordinating positions on the transition metal atoms can be employed to bond to groups other than the organic amine ligands, thereby coordinating such other groups to the metal atoms and bonding them from the glass surface to organic resins with which the glass might be mixed. For example, when trivalent chromium is employed with triethylene tetraamine as a coordinating agent and the silicate of this is formed, there are still two unused coordinating positions in the six coordinate chromium atoms which may be employed to coordinate with organic acids such as methacrylic acid to prepare a film-forming coupling agent of a novel and unusual type.

What is claimed is:

1. A silicate of a metal-containing cation coordinated to a ligand, the metal being selected from the group consisting of divalent cadmium, trivalent chromium, divalent cobalt, divalent copper, divalent iron, trivalent iron, divalent manganese, divalent nickel, and divalent zinc; the ligand being a polyamine having the formula:

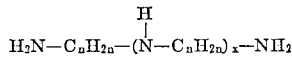

wherein $n = 2$ to 6 and
$x = 0$ to 3;

with the provisos that:
(I) the free hydroxide of the ligand coordinated metal cation is water soluble in an aqueous solution having a pH of at least 11.5 at a concentration of one-tenth of an atomic weight of metal per liter; and
(II) the silicate is appreciably soluble in a solvent selected from the group consisting of water and ethanol.

2. The composition of claim 1 wherein $n$ is 2 or 3.

3. The composition of claim 2 wherein the polyamine is selected from the group consisting of diethylene triamine, triethylene tetraamine and tetraethylene pentaamine.

4. The composition of claim 1 wherein the transition metal is divalent zinc.

5. A method for making the silicate of claim 1 comprising mixing together:
(i) a metal hydroxide selected from the group consisting of cadmium hydroxide, chromic hydroxide, cobaltous hydroxide, cupric hydroxide, ferrous hydroxide, ferric hydroxide, manganous hydroxide, nickel hydroxide, and zinc hydroxide;
(ii) a polyamine having the formula:

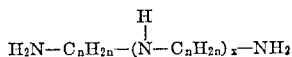

wherein $n = 2$ to 6 and
$x = 0$ to 3;
and
(iii) a source of silica.

6. The method of claim 5 wherein $n$ is 2 or 3.

7. The method of claim 6 wherein the polyamine is selected from the group consisting of diethylene triamine, triethylene tetraamine, and tetraethylene pentamine.

8. The method of claim 5 wherein the hydroxide is zinc hydroxide.

9. The method of claim 5 wherein the metal hydroxide is first mixed with the polyamine and the resulting mixture then mixed with a source of silica.

10. The method of claim 9 wherein $n$ is 2 or 3.

11. The method of claim 10 wherein the polyamine is selected from the group consisting of diethylene triamine, triethylene tetraamine, and tetraethylene pentaamine.

12. The method of claim 9 wherein the hydroxide is zinc hydroxide.

13. A method for making the composition of claim 1 comprising the steps of:
(1) mixing together
(i) a water soluble salt of a metal selected from the group consisting of divalent cadmium, trivalent chromium, divalent cobalt, divalent copper, divalent iron, trivalent iron, divalent manganese, divalent nickel, and divalent zinc,
(ii) a polyamine having the formula:

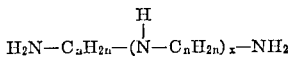

wherein $n = 2$ to 6 and
$x = 0$ to 3, and
(iii) a source of silica, and
(2) contacting the mixture of step 1 with the hydroxyl form of a strong anion exchange resin.

14. The method of claim 13 wherein $n$ is 2 or 3.

15. The method of claim 14 wherein the polyamine is selected from the group consisting of diethylene triamine, triethylene tetraamine, and tetraethylene pentaamine.

16. The method of claim 13 wherein the metal is divalent zinc.

References Cited

Vydra et al., J. Inorg. Nucl. Chem., vol. 26, pp. 1319–24 (1964).

Martell et al., Chemistry of Metal Chelate Compounds, Prentice-Hall, Inc. New York pp. 518–20 (1953).

TOBIS E. LEVOW, Primary Examiner

H. M. S. SNEED, Assistant Examiner

U.S. Cl. X.R.

117—107.2; 260—429, 438.1, 438.5, 439